though synchronism. This invention, however, substantially overcomes the instability of the rotary converter during the otherwise unstable period of its operation by arbitrarily reducing the speed of the converter to zero, meanwhile maintaining a substantial direct current voltage upon the direct current side thereof so that when the speed of the converter, due to such deceleration, becomes zero a direct current will be supplied therethrough to the secondary of the induction motor, causing the same to operate at synchronous speed. When the converter speed is substantially zero, the field of the converter is reversed and the converter is then permitted to gradually accelerate in a direction opposite to that in which it previously rotated, and, during this gradual acceleration, energy, the components of which will have a reverse phase order and a gradually increasing frequency, will be supplied by the converter to the induction motor secondary, so that the speed of the secondary will be gradually increased to super-synchronous values.
UNITED STATES PATENT OFFICE.

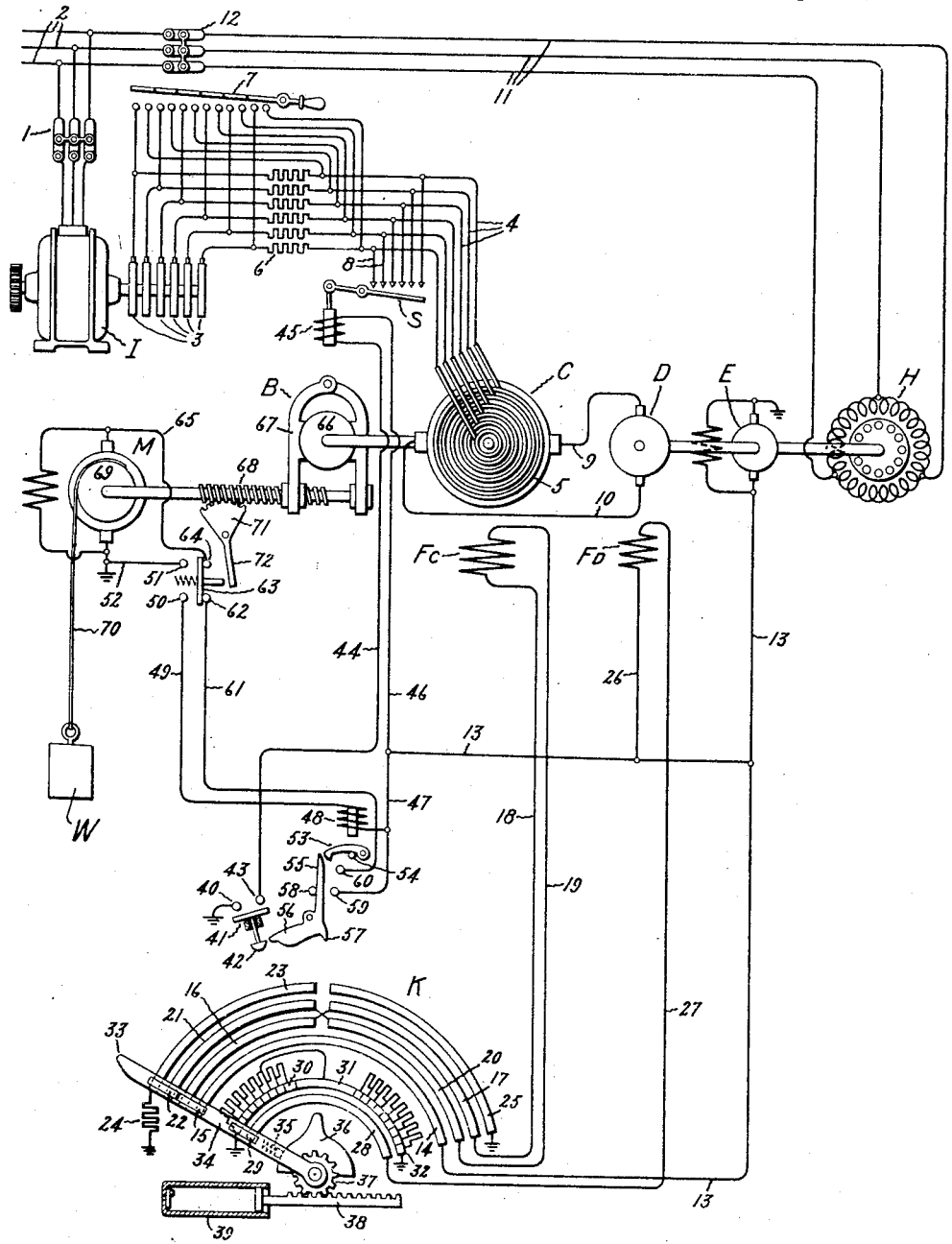

ERNST F. W. ALEXANDERSON, OF SCHENECTADY, NEW YORK, AND DAVID C. PRINCE, OF SPRINGFIELD, ILLINOIS, ASSIGNORS TO GENERAL ELECTRIC COMPANY, A CORPORATION OF NEW YORK.

SPEED CONTROL OF INDUCTION-MOTORS.

1,301,632.      Specification of Letters Patent.      Patented Apr. 22, 1919.

Application filed March 17, 1917. Serial No. 155,468.

*To all whom it may concern:*

Be it known that we, ERNST F. W. ALEXANDERSON and DAVID C. PRINCE, citizens of the United States, residing, respectively, at Schenectady, county of Schenectady, State of New York, and at Springfield, county of Sangamon, State of Illinois, have invented certain new and useful Improvements in Speed Control of Induction-Motors, of which the following is a specification.

This invention relates to the speed control of induction motors and more especially to the speed control of induction motors by means of rotary converters.

The purpose of the present invention is to so construct and operate an induction motor speed control system in which a rotary converter is electrically interposed between the induction motor secondary and a direct current dynamo electric machine that the speed of the induction motor may be varied through an extensive range including sub-synchronous, synchronous and super-synchronous speeds, that its operation at each selected speed will be safe, certain and stable for all motor loads within the limits for which the motor is designed, that the operation of the system during the transition from one speed to another will be dependable regardless of the speeds between which the transition occurs, and that the speed variations throughout the entire range will be effected gradually, safely and with certainty.

The present invention will be more readily understood if reference be first made to the phenomena observed when it is attempted to carry the speed of an induction motor from a sub-synchronous to a synchronous value by means of an ordinary rotary converter, the alternating current side of which is electrically connected to the phase wound induction motor secondary and the direct current side of which is connected to a source of direct current, the voltage of which may be changed both in amount and direction. With this arrangement, if the induction motor be without load, it is possible to raise the speed thereof through synchronism by decreasing the voltage, applied to the direct current end of the converter, to substantially zero, then reversing and increasing said voltage. This manipulation of the voltage causes the rotary to decelerate, reverse and accelerate and is accompanied by a tendency on the part of the induction motor to respond to the changes, effected in the circuits of the secondary thereof by the rotary, and hence to pass through synchronism. In the above described operation, however, even when the induction motor is without load, it usually happens that the converter requires several chances before it succeeds in dragging the induction motor through synchronism. In this operation it has been observed that the rotary will revolve slowly in the over-synchronous direction, while the speed of the induction motor increases, and then the converter will break out of step, make a quick fractional revolution and apparently catch on the next cycle, this process being repeated a time or two until the motor reaches a stable over-synchronous speed. When the induction motor is loaded to any considerable percentage of full load, it becomes wholly impossible to drag the induction motor through synchronism. This invention, however, substantially overcomes the instability of the rotary converter during the otherwise unstable period of its operation by arbitrarily reducing the speed of the converter to zero, meanwhile maintaining a substantial direct current voltage upon the direct current side thereof so that when the speed of the converter, due to such deceleration, becomes zero a direct current will be supplied therethrough to the secondary of the induction motor, causing the same to operate at synchronous speed. When the converter speed is substantially zero, the field of the converter is reversed and the converter is then permitted to gradually accelerate in a direction opposite to that in which it previously rotated, and, during this gradual acceleration, energy, the components of which will have a reverse phase order and a gradually increasing frequency, will be supplied by the converter to the induction motor secondary, so that the speed of the secondary will be gradually increased to super-synchronous values.

For a more complete understanding of our invention, reference may be had to the accompanying drawing, which represents diagrammatically one embodiment of our invention.

Referring to the drawing, the induction motor I, whose speed it is the object of our invention to control, is connected, by means of the three pole switch 1, to the supply mains 2. The secondary of said motor is provided with slip rings 3 electrically connected, by means of conductors 4, to the slip rings 5 of a rotary converter C, having a field winding $F_C$. In the conductors 4 are inserted starting resistances 6 adapted to be short circuited by the switch 7. Conductors 8 lead from the conductors 4 to a short circuiting switch S, the purpose of which will be hereinafter described.

The direct current end of the rotary converter C is connected by means of conductors 9 and 10 to a direct current dynamo electric machine D, having a field winding $F_D$. The armature of the dynamo electric machine D is mounted upon a shaft which carries the armature of an exciter E and the rotor of an alternating current machine H.
The dynamo electric machine D, during one period of its operation, functions as a motor, being supplied with energy from the rotary converter C, to drive the alternating current machine H which delivers energy to the mains 2 through leads 11 and a three pole switch 12. At another period of its operation, the dynamo electric machine D functions as a generator to supply energy to the rotary converter C, being driven at this time by the alternating current machine H, operating as an induction motor and supplied with energy from the supply mains 2 through the three pole switch 12 and conductors 11.
The field $F_C$ of the rotary converter C and the field $F_D$ of the dynamo electric machine D are energized by current supplied from the exciter E. The strength and direction of the field $F_C$ of the rotary converter C and the strength of the field $F_D$ of the dynamo electric machine D are determined by the operation of the controller K, in a manner hereinafter described.

Mounted upon the shaft of the rotary converter is a pulley 66 which, with members 67, constitutes a brake B, the function of which is to control in the desired manner the deceleration and acceleration of the rotary converter. Coöperating with the members 67 is a threaded shaft 68 to which are keyed a pulley 69 and the armature of a brake motor M. Passing about the pulley 69, and adapted to be wound thereon, is a belt or cable 70 to the end of which is attached a weight W.
Operated by the threaded portion of the shaft 68 is a member 71 having a projection 72 which is adapted to effect the operation of a switch 63.

The motor M is operated to set the brake B by current supplied by the exciter E through the following circuit: exciter E, conductors 13 and 47, contact 59, switch 55, contact 60, conductor 61, contact 62, switch 63, contact 64, conductor 65, motor M, through ground to exciter E.

The short circuiting switch S is operated by means of an electromagnet 45 which is energized by current supplied by the exciter E through the following circuit: exciter E, conductors 13 and 46, electromagnet 45, conductor 44, contact 43, switch 41, contact 40, through ground to exciter E.

A latch 53 retains the switch 55 in closed position during the application of brake B. When the brake is fully applied, however, switch 63 having been moved by projection 72 to bridge the contacts 50 and 51, electromagnet 48 will be energized by the exciter E through the following circuit: exciter E, conductors 13 and 47, electromagnet 48, conductor 49, contact 50, switch 63, contact 51, conductor 52, through ground to exciter E. The latch 53 will be raised, thereby permitting the switch 55 to drop open under the action of gravity.

The switch 55 is provided with a projection having a cam portion 56 and a detent 57 which perform functions hereinafter described. A pin 58 is employed to limit the counter-clockwise movement of the switch 55.

To control the operation of the various elements already described, we employ a controller K having a pivoted arm 34, provided with contact members 29, 15 and 22, and a rounded extremity 33. Said extremity 33 is adapted to close the switch 41 by engagement with a cam 42, attached to said switch, and also to close switch 55 by engagement with the cam 56. The detent 57 is adapted to engage with the extremity 33, when the switch 55 is locked in its closed position by latch 53, to limit the movement of the controller arm 34 in a clockwise direction. Upon the shaft, to which the said controller arm is secured, is mounted a gear 37 which engages with a toothed rack 38, said rack being connected to the dash pot 39. Engaging with the movable contact 29, throughout the range of its movement, is a stationary arc-shaped contact 28, which is connected to the field $F_D$ by means of the lead 27. Adapted to engage with the movable contact 29 are also provided segmental contacts 30, 31 and 32. Between the segmental contacts 30 and also between the segmental contacts 32, are interposed suitable resistance sections. The segment 31 is electrically connected to an intermediate segment 30. The outermost segment 30 and the outermost segment 32 are grounded.

Engaging with the movable contact 15, throughout the range of its movement, is a stationary arc-shape contact 14, one end of which is connected through the lead 13 to the exciter E. Adapted to engage with the contact 15 are stationary arc-shaped contacts 16 and 20, the former being in engagement during one portion of the movement of the contact 15, and the latter during another portion of said movement. The contact 20 is connected through the lead 19 with the field $F_C$ of the rotary converter.

Adapted to engage with the movable contact 22 are stationary arc-shaped contacts 21 and 17, the former being in engagement during one portion of the travel of said contact 22, and the latter during another portion of said travel. The contact 17 is connected to the field $F_C$ of the rotary converter through the lead 18. Adapted to engage with the movable contact 22 are also provided arc-shaped contacts 23 and 25, the former being in engagement during one portion of the travel of said contact 22, and the latter during another portion of said travel. The segment 23 and the segment 25 are grounded, the former through a resistance 24 and the latter directly. Contact 16 is electrically connected to contact 17 and contact 20 is electrically connected to contact 21, at all times. A cam 36 and spring-pressed follower 35 are provided to prevent the controller arm remaining in change over position.

In starting the system let it be assumed that the controller arm 34 is in a position to close the switch 41, that the brake B is ineffective, and that the switches 1, 7 and 12 are open. The switch 12 will first be closed whereupon the alternating current dynamo-electric machine H will start and operate as an induction motor to drive the direct current dynamo-electric machine D and the exciter E. Upon the building up of the exciter voltage electromagnet 45 will be energized in a manner hereinbefore explained, and the short circuiting switch S will be closed. With the controller arm 34 in the assumed position, the field winding $F_D$ of the dynamo-electric machine D will be connected, in series with the resistance sections interposed between the segmental contacts 30, to the exciter E, and the field winding $F_C$ of the converter will be connected, in series with the resistance 24, to the exciter E, as hereinbefore explained. The electro-motive force developed by the dynamo-electric machine D will then have a low value and the converter C will operate at low speed.

The switch 1 will next be closed and the induction motor I will start with resistance in the secondary. At the proper time, the switch 7 will be closed whereupon the induction motor I will operate with short circuited secondary. If it be desired to decrease the speed of the induction motor I the controller arm 34 will be moved in a counter-clockwise direction. This will permit the switch 41 to open and hence cause the opening of the short circuiting switch S by reason of the deënergization of the electromagnet 45. This movement of the controller arm 34 will also strengthen the field $F_D$ of the dynamo-electric machine D and hence increase the electro-motive force developed therein. In order to overcome the electro-motive force developed in the dynamo-electric machine D and drive the dynamo-electric machine D as a motor, the voltage on the direct-current side of the converter must be increased. In order to accomplish this, the alternating current voltage impressed upon the alternating current side of the converter must be increased. The secondary of the induction motor I will therefore decrease in speed until the slip is sufficient to supply the voltage demanded by the rotary converter.

If it be desired to increase the speed of the induction motor I to a value corresponding to short circuited secondary, the controller arm will be moved in a clockwise direction until the switch 41 is closed by the extremity 33 of the controller arm 34 engaging with the cam 42, whereupon the electromagnet 45 will be energized to close the short circuiting switch S. During this clockwise movement, the strength of the field $F_D$ of the dynamo-electric machine D is gradually decreased, and hence the electromotive force developed in said dynamo-electric machine is decreased so that the alternating current voltage demanded by the converter C is likewise decreased, thereby permitting the induction motor slip to decrease.

When the speed of the induction motor I is below that corresponding to short circuited secondary, the polyphase currents flowing between the induction motor secondary and the rotary converter transfer energy from the former to the latter. This energy is transformed by the rotary converter and supplied in the form of direct current energy to the dynamo-electric machine D, which is driven thereby as a motor and drives the alternating current dynamo-electric machine H as a generator to return electrical energy to the mains 2. With the induction motor secondary short circuited, there is substantially no transfer of electrical energy from the induction motor to the rotary converter.

If it be desired to carry the speed of the induction motor through synchronism, the clockwise movement of the controller arm 34 is continued. This continued movement first results in the opening of switch 41 and consequently the opening of short circuiting switch S. The switch 55 will then be closed by the engagement of the extremity 33 with the cam 56 and then the latch 53 will act to maintain the switch 55 closed. When the switch 55 is closed, the detent 57 is in a position to prevent further movement of the controller arm 34 in a clockwise direction until electromagnet 48 is energized and lifts the latch 53, in a manner hereinafter described. The closing of the switch 55 energizes the circuit of the motor M thereby causing the latter to rotate, gradually applying the brake B and winding the cable 70 upon the pulley 69, thus raising the weight W. With the controller arm in the last mentioned position, a portion of the resistance, previously in series with the field winding $F_D$, will have been removed by reason of the engagement of contact 29 with segment 31 and the field of the direct current dynamo-electric machine D will have been correspondingly strengthened.

During the application of the brake B the speed of the rotary converter is gradually brought to zero and the frequency of the polyphase currents flowing between the induction motor secondary and the converter will gradually approach zero. During this time energy will be transferred from the rotary converter to the induction motor secondary and the speed of the latter will approach synchronism. When the speed of the rotary converter becomes zero, the secondary of the induction motor will be excited by direct current shunted through the rotary converter and will rotate at synchronous speed. Substantially simultaneously with the full application of the brake and hence at the moment when the rotary converter comes to rest, the switch 63 will open the circuit of brake motor M and close the circuit of electromagnet 48, this operation of switch 63 being effected by the engagement of projection 72 therewith. The circuit of the electromagnet 48 now being closed, latch 53 will be lifted, whereupon the detent 57 will no longer prevent clockwise movement of the controller arm 34. The clockwise movement of the controller arm 34 is then continued until movable contact 15 engages stationary contact 20 and movable contact 22 engages stationary contacts 17 and 25, whereupon the field $F_C$ of the rotary converter is reversed and strengthened. During this movement of the controller arm, the brake motor circuit is open and hence weight W will rotate the shaft 68, to which the pulley 69 is attached, and disengage the brake. Its field having been reversed, the rotary converter will accelerate in a reverse direction during the disengagement of the brake. Upon the reversal of the direction of rotation of the rotary converter, the phase order of the polyphase currents flowing between the induction motor secondary and the rotary converter is reversed and during the acceleration of the rotary converter, the frequency of such polyphase currents will be increased. During this period electrical energy is transferred from the rotary converter to the induction motor secondary by the polyphase currents flowing therebetween, and the speed of the induction motor is caused to increase to a super-synchronous value. During the time that energy is transferred from the converter to the induction motor secondary, the dynamo-electric machine D acts as a generator to supply direct current energy to the direct current side of the rotary converter.

The speed of the induction motor can be varied through the super-synchronous speed range by adjusting the position of the controller arm 34 to vary the strength of the field $F_D$ and consequently the electro-motive force of the dynamo-electric machine D, an increase or decrease in the strength of the field $F_D$ resulting in an increase or decrease, respectively, in the speed of the induction motor.

The dash pot 39, with which the controller K is provided, insures against too sudden or rapid movement of the controller arm in a clockwise direction.

While we have described what we now consider to be the preferred method of starting our system, it may nevertheless be satisfactorily started when the controller arm 34 is in any position corresponding to a subsynchronous speed.

We conceive that various modifications of our invention may be made, and we accordingly do not desire to be limited to the exact arrangement shown and described but seek to cover in the appended claims all such modifications and arrangements as fall within the scope and spirit of our invention.

What we claim as new and desire to secure by Letters Patent of the United States, is:

1. The method of varying the speed of an induction motor, having a phase wound secondary, from a subsynchronous to a synchronous value by means of a rotary converter, the alternating current side of which is connected to the induction motor secondary and the direct current side of which is connected to direct current means adapted to supply or consume electrical energy, which consists in decreasing the energy transferred from the induction motor secondary to the converter by the polyphase currents flowing therebetween, and then maintaining a substantial voltage upon the direct current side of said converter and arbitrarily reducing the frequency of said polyphase currents to zero.

2. The method of varying the speed of an induction motor, having a phase wound secondary, from subsynchronous to supersynchronous values by means of a rotary converter, the alternating current side of which is connected to said secondary and the direct current side of which is connected to direct current means adapted to supply or consume electrical energy, which consists in decreasing the energy transferred from said secondary to the converter by the polyphase currents flowing therebetween, then maintaining a substantial voltage upon the direct current side of said converter and arbitrarily reducing the frequency of said polyphase currents to zero, and then reversing the phase order of said polyphase currents and gradually increasing the frequency thereof.

3. The method of carrying an induction motor from subsynchronous to supersynchronous speed, by means of a rotary converter electrically connected to the induction motor secondary, which consists in maintaining a direct current voltage on the armature of the converter, gradually bringing the speed of the converter armature to zero, reversing the converter field when the armature speed is substantially zero, and then permitting the armature to gradually accelerate in the opposite direction.

4. The method of varying the speed of an induction motor, having a phase wound secondary, from a subsynchronous to a synchronous value by means of a rotary converter, the alternating current side of which is connected to said induction motor secondary and the direct current side of which is connected to direct current means adapted to supply or consume electrical energy, which consists in decreasing the energy transferred from said secondary to the converter by the currents flowing therebetween, then closing a short circuit for said secondary, and then opening said short circuit, reversing the transfer of energy and gradually decreasing the frequency of said currents to zero.

5. The method of varying the speed of an induction motor, having a phase wound secondary, from subsynchronous to supersynchronous values by means of a rotary converter, the alternating current side of which is connected to said secondary and the direct current side of which is connected to direct current means adapted to supply or consume electrical energy, which consists in decreasing the energy transferred from said secondary to the converter, by the currents flowing therebetween, then closing a short circuit for said secondary, then opening said short circuit, reversing the transfer of energy and gradually decreasing the frequency of said currents to zero, and then reversing the phase order of said currents and gradually increasing the frequency thereof.

6. The method of varying the speed of an induction motor, having a phase wound secondary, from subsynchronous to supersynchronous values by means of a rotary converter, the alternating current side of which is connected to said induction motor secondary and the direct current side of which is connected to direct current means adapted to consume or supply electrical energy, which consists in decreasing the electromotive force developed by said direct current means, then increasing the electro-motive force developed by said direct current means to a predetermined value and gradually reducing the speed of the converter to substantially zero, then reversing the converter field, accelerating the converter, and varying the electro-motive force developed by said direct current means.

7. The method of varying the speed of an induction motor, having a phase wound secondary provided with short circuiting means, from a subsynchronous to a synchronous value by means of a rotary converter, the alternating current side of which is connected to said induction motor secondary and the direct current side of which is connected to direct current means adapted to consume or supply electrical energy, which consists in decreasing the electro-motive force developed by said direct current means, then rendering said short circuiting means effective, then rendering said short circuiting means ineffective and increasing the electro-motive force developed by said direct current means, then gradually reducing the speed of the converter to zero.

8. The method of varying the speed of an induction motor, having a phase wound secondary provided with short circuiting means, from a subsynchronous to a supersynchronous value by means of a rotary converter, the alternating current side of which is connected to said induction motor secondary and the direct current side of which is connected to direct current means adapted to consume or supply electrical energy, which consists in decreasing the electro-motive force developed by said direct current means, then effecting a short circuit of the induction motor secondary, then rendering said short circuiting means effective, then rendering said short circuiting means ineffective and increasing the electro-motive force developed by said direct current means, then gradually reducing the speed of the converter to zero, and then reversing the converter field and accelerating the converter.

9. The method of varying the speed of an induction motor, having a phase wound secondary, from subsynchronous to supersynchronous values by means of a rotary converter, the alternating current side of which is connected to said induction motor secondary and the direct current side of which is connected to a direct current machine adapted to operate either as a motor or as a generator and a brake adapted to be applied to the rotatable element of the converter, which consists in decreasing the strength of the field of the direct current machine, effecting a short circuit of the induction motor secondary, simultaneously opening said short circuit and increasing the strength of the field of the direct current machine, applying the brake to the converter armature, reversing the converter field when the armature speed is substantially zero, and then gradually disengaging the brake.

10. The method of operating a speed control system for an induction motor, comprising an induction motor the speed of which is to be regulated, a motor generator set consisting of a direct current machine and an alternating current machine either of which is adapted to operate as a motor or as a generator, a rotary converter electrically connected between the direct current machine and the secondary of the first named induction motor, and a brake adapted to be applied to the converter armature, which consists in gradually applying the brake, reversing the field of the converter when the speed of the converter armature becomes substantially zero, and gradually disengaging said brake whereby the speed of the said induction motor is varied from a subsynchronous to a supersynchronous value.

11. The combination with an induction motor having a phase wound secondary, of means to control the speed thereof comprising a variable source of direct current voltage, a rotary converter electrically connected between the source of direct current voltage and the induction motor secondary, and means, independent of the speed of the induction motor and of the electrical conditions in the converter, for controlling the speed of the latter.

12. The combination with an induction motor having a phase wound secondary, of means to control the speed thereof comprising a variable voltage source of direct current, a rotary converter electrically connected between said source and said induction motor secondary, a brake coöperating with the armature of said rotary, and means for controlling the brake, the field of the rotary converter and the voltage of said source.

13. The combination with an induction motor having a phase wound secondary, of means to control the speed thereof comprising a variable voltage source of direct current, a rotary converter electrically connected between said source and said induction motor secondary, a brake adapted to operate upon the armature of the rotary, short circuiting means for the induction motor secondary and the slip rings of the rotary converter, and means for controlling the brake, the short circuiting means, the field of the rotary converter, and the voltage of said source.

14. In a system of induction motor control, the combination of an induction motor, a motor generator set comprising a direct current machine and an alternating current machine of the induction motor type, a rotary converter electrically connected between the direct current machine and the induction motor secondary, a brake adapted to control the rotation of the converter armature, short circuiting means for the induction motor secondary and the slip rings of the converter, means to operate said brake comprising a motor, a limit switch operated by said motor for controlling the circuit thereof, and means controlling the operation of said short circuiting means, the fields of the rotary converter, the direct current machine, and the circuit of the motor operating the brake.

15. In a system of induction motor control, the combination of an induction motor having a phase wound secondary, a direct current source of energy, a rotary converter electrically connected between the direct current source and the induction motor secondary, a brake adapted to control the rotation of the converter armature, short circuiting means for the induction motor secondary and the slip rings of the converter, and means, comprising a controller, for effecting the operation of said short circuiting means, simultaneously rendering said short circuiting means ineffective and the brake effective, reversing the converter field, and rendering the brake ineffective.

In witness whereof the said ALEXANDERSON has hereunto set his hand this 10th day of March, 1917, and the said PRINCE has hereunto set his hand this 13th day of March, 1917.

ERNST F. W. ALEXANDERSON.
DAVID C. PRINCE.

Copies of this patent may be obtained for five cents each, by addressing the "Commissioner of Patents, Washington, D. C."